US008724544B2

(12) United States Patent
Jang et al.

(10) Patent No.: US 8,724,544 B2
(45) Date of Patent: May 13, 2014

(54) METHOD FOR TRANSMITTING A PACKET AT A BASE STATION IN A NETWORK USING MULTIPLE COMMUNICATION SCHEMES

(75) Inventors: Seo Woo Jang, Anyang-si (KR); Se Yeong Choi, Anyang-si (KR); Jun Ho Jo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 530 days.

(21) Appl. No.: 12/654,765

(22) Filed: Dec. 31, 2009

(65) Prior Publication Data

US 2011/0044240 A1 Feb. 24, 2011

Related U.S. Application Data

(60) Provisional application No. 61/235,367, filed on Aug. 20, 2009.

(30) Foreign Application Priority Data

Nov. 11, 2009 (KR) ........................ 10-2009-0108511

(51) Int. Cl.
*H04W 40/00* (2009.01)

(52) U.S. Cl.
USPC ........................................................ 370/328

(58) Field of Classification Search
CPC .......... H04L 12/4633; H04W 76/025; H04W 28/065; H04W 28/0236; H04W 28/0268; H04W 28/0247; H04W 28/0284; H04W 88/06

USPC ............. 370/328, 265, 466, 445; 455/93, 146
See application file for complete search history.

(56) References Cited

U.S. PATENT DOCUMENTS

| | | | | |
|---|---|---|---|---|
| 7,376,091 | B1 * | 5/2008 | Eccles et al. | 370/265 |
| 7,545,780 | B2 * | 6/2009 | Chitrapu | 370/338 |
| 2003/0016639 | A1 | 1/2003 | Kransmo et al. | |
| 2006/0077934 | A1 | 4/2006 | Lee et al. | |
| 2009/0098871 | A1 * | 4/2009 | Gogic | 455/435.1 |
| 2011/0013583 | A1 * | 1/2011 | Yang et al. | 370/330 |

FOREIGN PATENT DOCUMENTS

| KR | 10-2005-0085336 | 8/2005 |
|---|---|---|
| KR | 10-2008-0043253 | 5/2008 |

* cited by examiner

*Primary Examiner* — Thai Nguyen
(74) *Attorney, Agent, or Firm* — McKenna Long & Aldridge LLP

(57) ABSTRACT

A method of transmitting a packet, at a MS and base station operable using multiple communication schemes is disclosed. The base station of the multiple communication schemes receives a packet from the MS and then determines a transmission path based on a link status of a network, a traffic characteristic of the packet and the like. The base station transmits the packet of the first communication scheme via a network using a second communication scheme, thereby enabling traffic redirection. Such a resource as a frequency band and the like, which will be used between networks using different communication schemes, can be cooperatively set between the MS and the base station.

7 Claims, 6 Drawing Sheets

METHOD FOR TRANSMITTING A PACKET AT A BASE STATION IN A NETWORK USING MULTIPLE COMMUNICATION SCHEMES

CROSS-REFERENCE TO RELATED APPLICATIONS

Pursuant to 35 U.S.C. §119(e), this application claims the benefit of priority to Provisional Application No. 61/235,367, filed on Aug. 20, 2009 and Korean application No. 2009-0108511, filed on Nov. 11, 2009, the contents of which are incorporated by reference herein in their entirety.

FIELD OF INVENTION

The present invention relates to a wireless communication system, and more particularly, to a method for transmitting a packet in a network using multiple communication schemes.

DESCRIPTION OF THE RELATED ART

Generally, UMA (unlicensed mobile access) technology enables a cellular network to be incorporated with any IP based wireless access network such as IEEE 802.16 (WiMAX) network, IEEE 802.20 MBWA (mobile broadband wireless access) and UWB network.

Subscribers can move between a cellular network and WLAN using the UMA technology. In doing so, there is no seam between audio and data and the moving is transparently performed between cells within the cellular network. The seamless handover between the WLAN and the cellular network enables user's location and mobility not to affect a provided service. A subscriber can experience full transparency in aspects of service, location and mobility. And, the same service is always provided on a cellular network or WLAN. This UMA provides the technology for taking two paths to a core network by modifying a structure of a packet.

FIG. 1 is a diagram for an example of a case that a WLAN sharer changes one packet path.

Referring to FIG. 1, a MS 110 can access a WLAN sharer 120 by WLAN. And, the MS 110 can access a Wibro base station (BS) 130 via the WLAN sharer 120. In this case, a data packet transmitted from the MS 110 is delivered to the WLAN sharer 120 via an IP layer, a WLAN MAC layer and a WLAN physical layer within the MS 110 in order. The WLAN sharer 120 receives the data packet and then processes the received data packet and can then deliver the processed data packet to the Wibro base station 130.

A method for processing a data packet at the WLAN sharer 120 according to a related art is schematically explained as follows.

First of all, the WLAN sharer 120 reads a header part of a data packet received from the MS 110 and is then aware of an origin and destination of the data packet. The WLAN sharer 120 encapsulates the data packet received from the MS 110 and can then transmit the encapsulated data packet in a Wibro form. The WLAN sharer 120 reads the received data packet and then erases the origin and destination of the data packet. In particular, the WLAN sharer 120 erases the received data packet and then generates a new data packet according to a transmission path. Namely, the WLAN sharer 120 creates a Wibro type data packet to transmit the received data packet to the Wibro base station 130. Subsequently, the WLAN sharer 120 transmits the newly generated data packet to the Wibro base station 130.

SUMMARY

An object of the present invention devised to solve the problem lies in providing a packet transmitting method which can effectively in a wireless communication system which supports two communication schemes.

Accordingly, the present invention is directed to a method for transmitting a packet in a network using multiple communication schemes that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting a packet, at a base station (BS) in a network using multiple communication schemes according to the present invention includes receiving a packet of a first communication scheme from a MS, encapsulating the packet of the first communication scheme by inserting an information including a transmission path via a network of a second communication scheme into the received packet of the first communication scheme, and transmitting the encapsulated packet to a destination using the network of the second communication scheme.

Preferably, a frequency band used by the network of the first communication scheme is different from a frequency band used by the network of the second communication scheme.

Preferably, a link using the first communication scheme between the base station and the MS uses the same frequency band of a link between the base station and the network using the first communication scheme.

More preferably, either an odd or even subband of the same frequency band using the first communication scheme between the base station and the MS is used.

Preferably, in the receiving step, the packet of the first communication scheme is received via the network using the first or second communication scheme.

To further achieve these and other advantages and in accordance with the purpose of the present invention, a method of transmitting a packet, at a network controller in a network using multiple communication schemes includes receiving a packet of a second communication scheme via the network using a first communication scheme from a base station operable according to the multiple communication schemes or a base station controller and transmitting the received packet of the second communication scheme via the network using the second communication scheme.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the present invention, examples of which are illustrated in the accompanying drawings. The detailed description disclosed in the following together with the accompanying drawings does not propose a sole embodiment of the present invention but intends to explain exemplary embodiments of the present invention. The detailed description in the following includes details to provide the full understanding of the present invention. Yet, it is apparent to those skilled in the art that the present invention can be implemented without those details. For instance, the following detailed descriptions are made on the assumption that a mobile communication system includes 3GPP LTE system and are also applicable to any kind of mobile communication system except specific items of the 3GPP LTE.

Occasionally, structures and devices known in public are omitted to avoid the vagueness of the concept of the present invention but can be illustrated as block diagrams centering on core functions of the structures and devices.

In the whole specification, if a prescribed part 'includes' a prescribed element, this means that another element can be further included instead of excluding other elements unless any opposite description exists.

In the following description, assume that a mobile station (MS) is a common name of a mobile or stationary user side equipment such as a user equipment (UE), MS, a handset and the like. Moreover, assume that a base station (BS) is a common name of such a random node of a network side, which communicates with a MS, as Node B, eNode B, base station, access point (AP) and the like.

In a mobile communication system, a MS (user equipment) is able to receive information in downlink from a base station (BS) and is also able to transmit information in uplink. The information transmitted or received by the MS includes data and various kinds of control information. And, various physical channels exist according to type usages of the information transmitted or received by the MS.

'UMA MS' used by the present invention can be differently named 'dual mode MS', 'handset' or the like. In the present invention, for example, 'multimode MS' and 'multimode base station (BS)' shall be described as 'dual mode' and 'dual mode base station', respectively. Namely, 'dual mode MS' and 'dual mode BS' used for the present invention are sufficiently extensible to at least two kinds of multimode.

Figure 1:
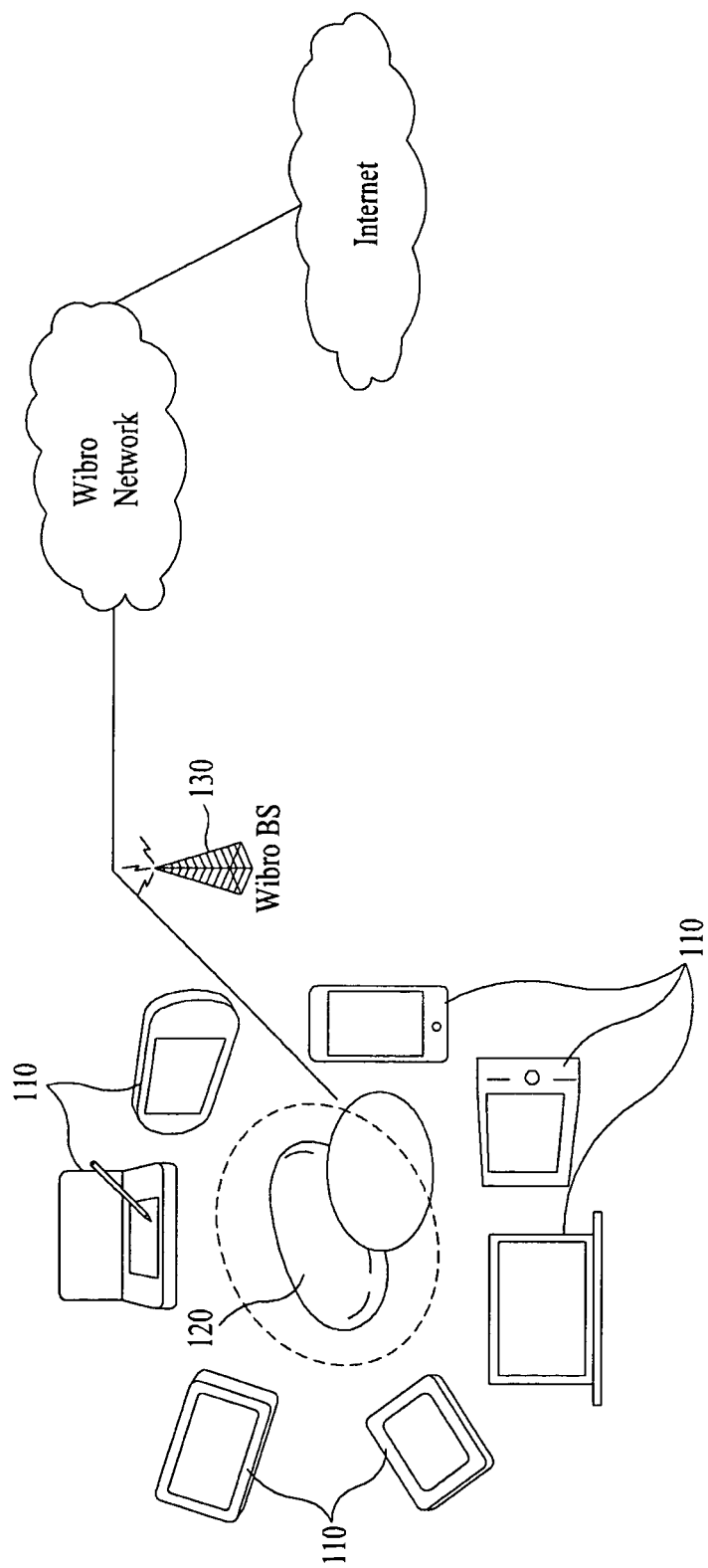
FIG. 1 is a diagram for an example of a case that a WLAN sharer changes one packet path.
Figure 2:
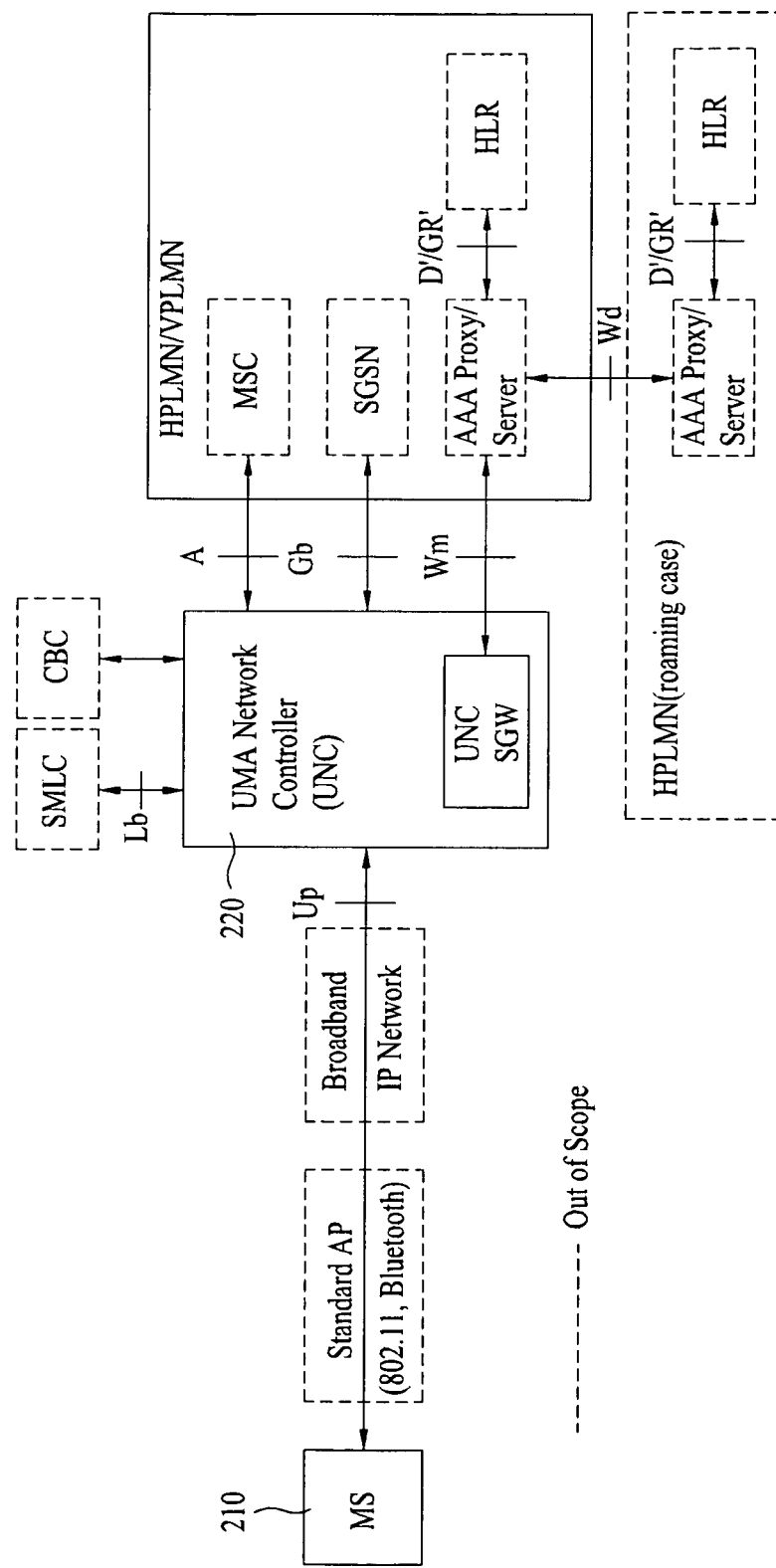
FIG. 2 is a diagram for a functional structure of UMA network.

FIG. 2 is a diagram for a functional structure of UMA network.

Referring to FIG. 2, a UMS MS 210 is connected to a UMA network controller (UNC) 220. In this case, the UMA MSMS 210 is connected to the UNC 220 through a standard AP (802.11 Bluetooth) or broadband IP network. The UNC 220 is also connected to a base station controller (BSC, not shown in the drawing).

In uplink, the UMA MS 210 encapsulates a data packet to transmit to the UNC 220. The UNC 220 decapsulates the received data packet and can then transmit the decapsulated data packet to a core network.

In downlink, the UNC 220 can encapsulate a data packet and then can transmit the encapsulated data packet to the UMA MS 210. The UMA MS 210 can then decapsulate the data packet received from the UNC 220.

The UMA MS 210 connected to the broadband IP network via the UNC 220 is authenticated/authorized to access GERAN audio and UTRAN data via an unlicensed wireless network. On cellular radio access network and UMAN (Unlicensed Mobile Access Network), current location of subscriber stored in a core network is identically updated and mobile audio and data communication is delivered.

If the MS having the UMA moves away out of an unlicensed wireless network range, the UNC 220 and the UMA MS 210 can perform roaming to cellular network.

While a user of the MS 210 is performing a voice call on GERAN network or a UTRAN data session is established, if the MS 210 moves away into a range of the unlicensed wireless network, the voice call and data session automatically experience handover between the two networks. That is, as the UMA operates in dual mode, handover automatically occurs between the GERAN and the UTRAN.

Bluetooth is the industrial standard of personal area networks (PANs) that uses IEEE 802.15.1 specification. Bluetooth enables various devices to communicate with each other safely and with low costs using globally available radio frequencies. And, Bluetooth uses 2.45 GHz of ISM band.

In case of Bluetooth version 1.1 and Bluetooth version 1.2, a data rate amounts 732.1 Kbits per second. Bluetooth version 2.0 is characterized in having EDR (enhanced data rate) and is able to perform a data rate of 2.1 Mbits per second. Bluetooth is ongoing to replace a wired USB, whereas Wi-Fi replaces Ethernet.

If a user having a UMA MS is located in the vicinity of a UMA radio base station (Bluetooth or Wi-Fi), it is able to use the same service of GSM/GPRS (global system for mobile communications/general packet radio service) through an unlicensed radio frequency.

The unlicensed radio frequency is the frequency that is available for a plurality of users without causing any interference with a specific frequency instead of granting an exclusive use authority for a prescribed frequency to a user. The unlicensed frequency includes 2.45 GHz of ISM (industrial scientific medical) band. Like seamless handover occurs between cellular base stations in using a mobile phone, a UMA MS enables seamless handover between a cellular base station and a UMA base station.

UMA includes a new network element called a UMA network controller (UNC). The UNC plays a role similar to that of a base station controller (BSC) in a traditional cellular radio access network (RAN). In particular, a UMA MS is connectable to a core mobile network via BSC on a radio access network (RAN) in performing a voice call and is operable in a dual mode to be connected to the core mobile network via UNC.

Subscribers can move between a cellular network and a wireless LAN using the UMA technology. In doing so, audio and data sessions are seamless in-between and the moving is transparently performed between cells within the cellular network. The handover in a seamless call between the wireless LAN and the cellular network enables a location and mobility of a user to avoid affecting a service provided to the user. A subscriber is able to experience full transparency in aspects of service, location and mobility. And, the same service is always provided on the wireless LAN or the cellular network.

Mobile service providers having UMA (unlicensed mobile access) arranged are able to provide a plan of an enhanced service for extending their portfolios from traditional mobile services by absorbing wired service profits. Wired service providers are able to keep traffics on a stationary network infrastructure while adding mobile services to the traditional local, long-distance and broadband accesses. In every case, a subscriber can experience a seamless service in which boundary lines of a base network are unseen.

The UMA implements a parallel wireless access network, i.e., UMAN (UMA network). This becomes an interface with a mobile core network using a conventional standard interface that enables mobility to be realized. The mobile core network remains unchanged.

A common mobile core network provides transparency in operation with a full-scale service. Conventional service provider BBS (business support systems), service providing system, contents service, regulation observant system and operation support systems (OSS) can support the UMA network without changes. The service enhancement and technology development of the mobile core network are transparently applied to both of the cellular access and the UMA network.

UNC is a primary network entity of a UMA solution. The UNC becomes an interface with GSM/GPRS core network as if it is a sub-system of a conventional GSM/EDGE radio access network (GERAN) base station. And, the UNC is interfaced with a public or private IP network and then communicates with MSs equipped with UMA function. For the GSM/GPRS core network, the UNC provides a standard GSM A interface 230 for a circuit switching voice service and a GPRS Gb interface 240 for a packet data service.

Within the UMAN, an interface between a UNC and a MS is defined as an 'up' interface. The UNC can support up-interfaces for the respective stations using standard IP transport. The UNC maintains an end-to-end communication with each station and relays GSM/GPRS control and user plane traffics through A/Gb interface toward a mobile core network.

The UNC enables an IP based UMAN access network to look like a conventional GERAN for a core network. The primary functions are explained as follows.

1) Safe and private communication function is provided between each MS and a core network of a service provider through an open IP network. By providing discovery, registration and redirection services, stations are enabled to access proper UNC.

2) GSM/GPRS core network control signaling with stations in higher layer is relayed.

3) UMAN bearer connection for circuit and packet services is set or released.

4) Voice bearer forwarded to voice-over-circuit transport from VoIP transport is transcoded toward a conventional PCM based A interface.

5) Paging for UMAN mobile access, handover and similar radio access procedures are simulated.

6) A and Gb interfaces properly provided with physical, signaling and bearer interfaces according to the standards are provided.

Dual-mode MS and dual-mode BS are operable in a dual mode scheme that can be mode-switched between a wireless LAN (WLAN) and a cellular network, between Bluetooth and a cellular network, between a wireless LAN (WLAN) and Bluetooth, between a cellular relay and a femto cell or the like. Each of the dual-mode MS and the dual-mode base station can use a different frequency band for each mode or use the same frequency band. The dual-mode base station is able to single-mode legacy MSs (handsets) operable on a conventional cellular network or an IP network only as well as the dual-mode MS.

According to the present invention, a packet switching scheme is applicable to a data packet. The packet switching means a scheme for segmenting a data by a small unit called a packet, encapsulating/decapsualting the packet and transmitting the encapsulated/decapsulated packet. Each packet is independently handled and can be transmitted via different path. If packets fail to arrive at a destination in order, a problem of error control or flow control may be caused. And, each packet needs a destination address and an origin address. This packet switching communication scheme is suitable for a case of transmitting data of small content.

Figure 3:
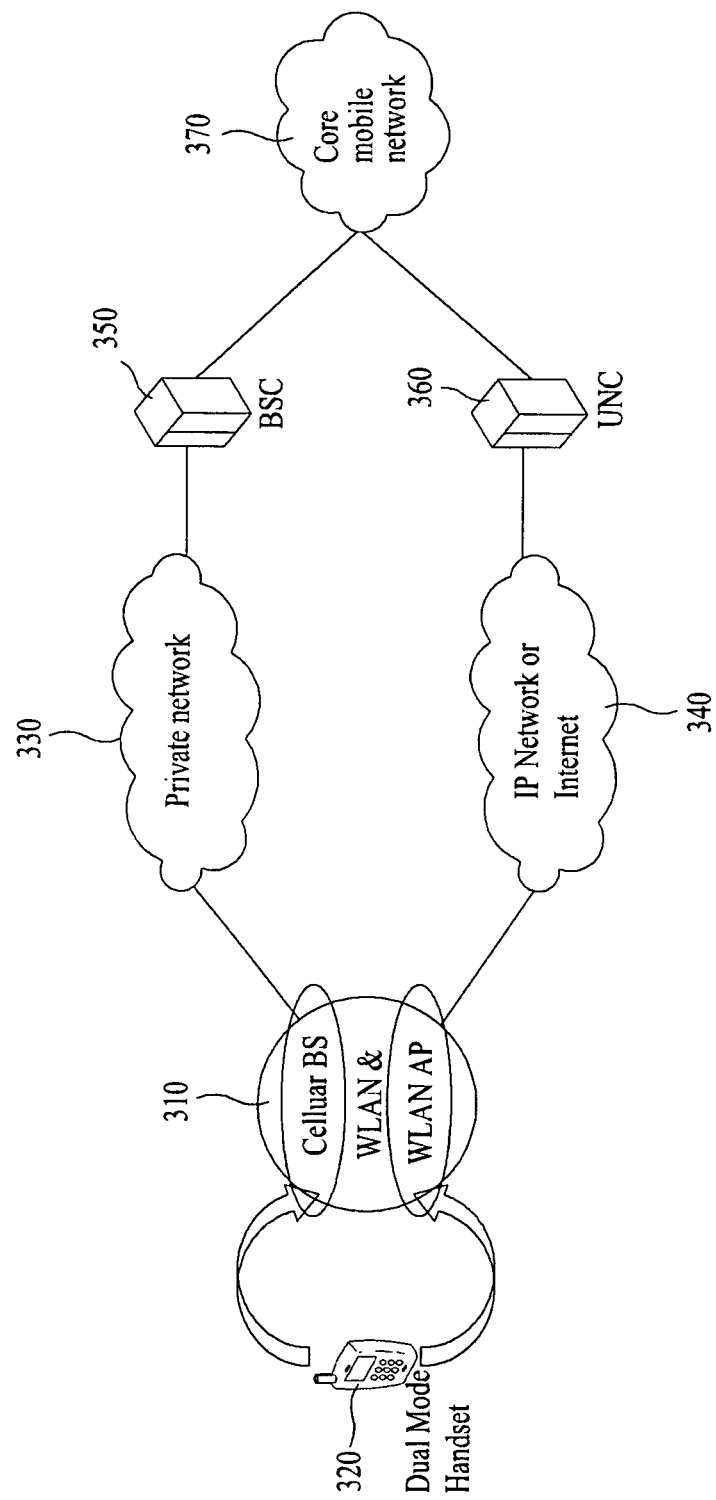
FIG. 3 is a diagram for one example of a network structure using UMA technology.

FIG. 3 is a diagram for explaining a newly proposed technology according to the present invention using UMA technology.

Referring to FIG. 3, a dual-mode base station 310 can receive packets from a dual-mode MS (dual-mode handset) 320. The dual-mode base station 310 can transmit the received data packets to base station controller (BSC) 350 or a UMA network controller (UNC) 360 using a private network 330 or an IP network 340. In this case, the private network 330 can be named a cellular network or the like and the IP network 340 can be named a WLAN network, a UMA network or the like. A frequency band used by the private network 330 may be different from a frequency band used by the IP network 340.

The dual-mode MS 320 can transmit a packet using either the private network 330 (e.g., cellular network) or the IP network 340 (e.g., WLAN). As mentioned in the foregoing description, the cellular network and the WLAN can use frequency bands differing from each other. The dual-mode MS 320 can dynamically determine a specific path for transmitting a packet according to a requested quality of service (QoS) or a status of a link.

For instance, in case of a traffic that is considerably sensitive to a delay, the MS is set to use the private network 330. In case of a traffic that is considerably insensitive to a delay, the MS is set to use the IP network 340. Thus, the dual-mode MS 320 can determine the transmission path according to the delay sensitivity of a data packet to transmit.

In a session setting step, the dual-mode MS 320 can measure a round trip time (RTT) of a path via the UNC 360 and a round trip time (RTT) of an original path. In this case, the RTT indicates a time taken for a packet to make a round trip to a correspondent party side in transmitting the packet. In particular, the RTT can mean a time taken for a packet to make a round trip to the dual-mode MS 320, which is a packet destination, from a packet origin via the core network 370 or to the dual-mode MS via the UMA network. RTT is an example indicating the traffic complexity. Except for the RTT, another measurement method of the traffic complexity is present.

Factors affecting the RTT include network complexity, distance, data rate and the like. The dual-mode MS 320 can select a transmission path of a packet based on the RTT measured value and the like.

Alternatively, the UNC 360 can measure an RTT value instead of the dual-mode MS 320. And, the UNC 360 can report the measured RTT value to the dual-mode MS 320. This report of the measured RTT value to the dual-mode MS 320 from the UNC 360 can be performed at an even-triggered timing point or periodically.

The RTT measurement by the UNC 360 is performed according to a request made by the dual-mode MS 320 or can be previously set for the UNC 360 to measure an RTT value.

The dual-mode MS 320 is able to make a request to measure an RTT and a current link status to the UNC 360.

As above mentioned, the dual-mode MS 320 can selectively determine a transmission path for transmitting a data packet based on the value of RTT measured by the dual-mode MS 320 or the UNC 360 and the like.

The dual-mode base station 310 can encapsulate or decapsulate the data packet received from the dual-mode MS 320 instead of the dual-mode MS 320 or the UNC 360. In particular, the dual-mode base station 310 can perform an encapsulating process for delivering a data packet through the transmission path determined by the dual-mode MS 320.

Meanwhile, the dual-mode base station 310 receives the data packet from the dual-mode MS 320 and then can redirect a packet traffic. Even if the dual-mode MS 320 selects a transmission path and then transmits a data packet with the indication of the selected transmission path, the dual-mode base station 310 can change the transmission path selected by the dual-mode MS 320 according to other factors.

The dual-mode base station 310 can transmit the data packet received from the dual-mode MS 320 via the private network 330 or the IP network 340. For instance, in case that the private network 330 around the dual-mode base station 310 is complex or a link status is poor, the dual-mode base station 310 can transmit a data packet to the UNC 360 via the IP network 340 rather than the private network 330. If so, a redirection process is performed in the following manner. First of all, the UNC 360 redirects the data packet to the BSC 350. The BSC 350 then transmits the data packet to the core mobile network 370.

Alternatively, in case that the IP network 340 around the dual-mode base station 310 is complex or a link status around the dual-mode base station 310 is not reliable, the dual-mode base station 310 can transmit a WLAN packet to the BSC 350 using the private network 330. If so, the BSC 350 delivers the WLAN packet to the UNC 360. The UNC 360 can then redirect the WLAN packet received from the BSC 350 to the IP network 340. Thus, the dual-mode base station 310 can maintain the redirection session together with the UNC 360.

Figure 4:
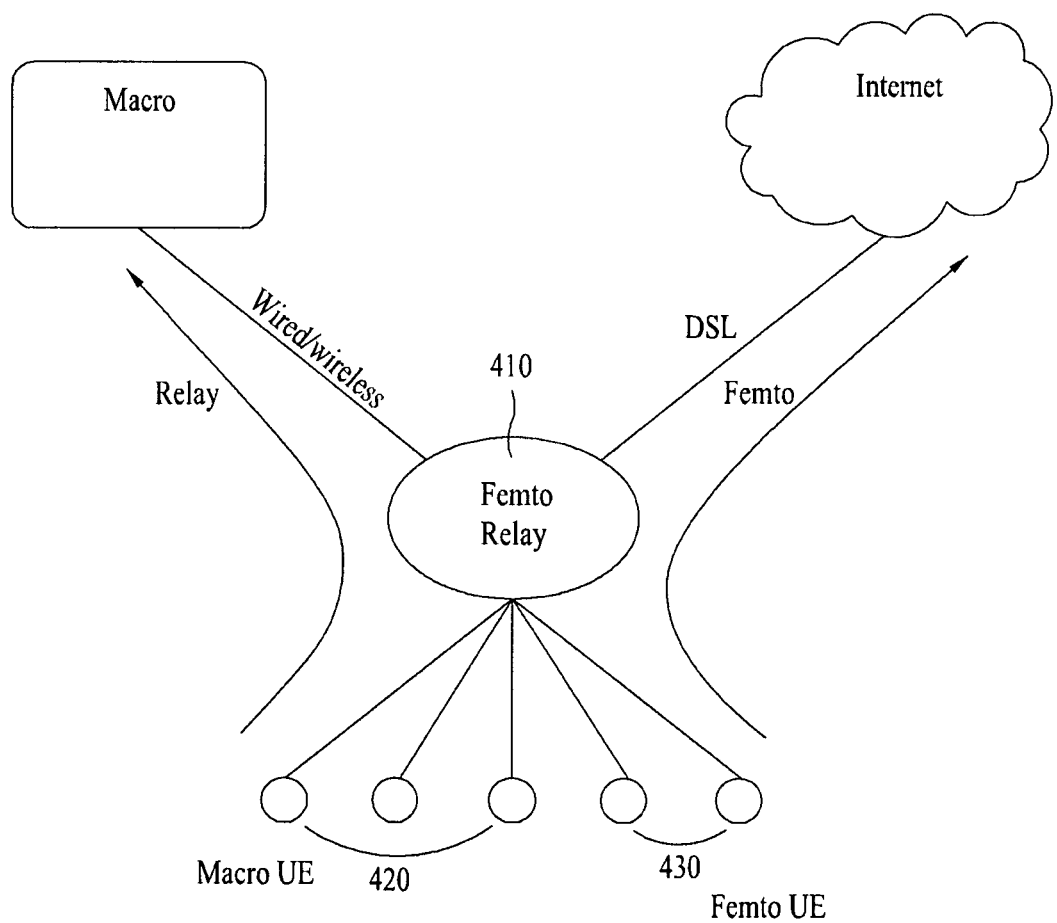
FIG. 4 is a diagram for one example of a network that includes a base station operating in a dual mode.

FIG. 4 is a diagram for one example of a network that includes a base station operating in a dual mode.

Referring to FIG. 4, a femto and relay use the same technique. A dual-mode base station 410 can receive a packet from a macro MS 420 and a packet from a femto MS 430. The dual-mode base station 410 can identify a type of a MS having transmitted the corresponding packet using the received packet.

For instance, an identifier (or an indicator) for identifying a type of a MS can be included in a header part of a packet, which is to be transmitted to the dual-mode base station 410, by each of the macro MS 420 and the femto MS 430. Based on this identifier, the dual-mode base station 410 can identify the type of the MS having transmitted the corresponding packet. If so, the dual-mode base station 410 can transmit a packet via a specific network corresponding to the type of the MS having transmitted the packet.

For instance, the dual-mode base station 410 can transmit a packet received from the macro MS 420 to another base station and the like through a wireless network. Moreover, the dual-mode base station 410 can transmit a packet received from the femto MS 430 through DSL (digital subscriber line). In doing so, if a traffic or link status of the wireless network is not good, the dual-mode base station 410 can transmit a packet using the DSL network despite that the corresponding packet has been received from the macro MS 420.

Figure 5:
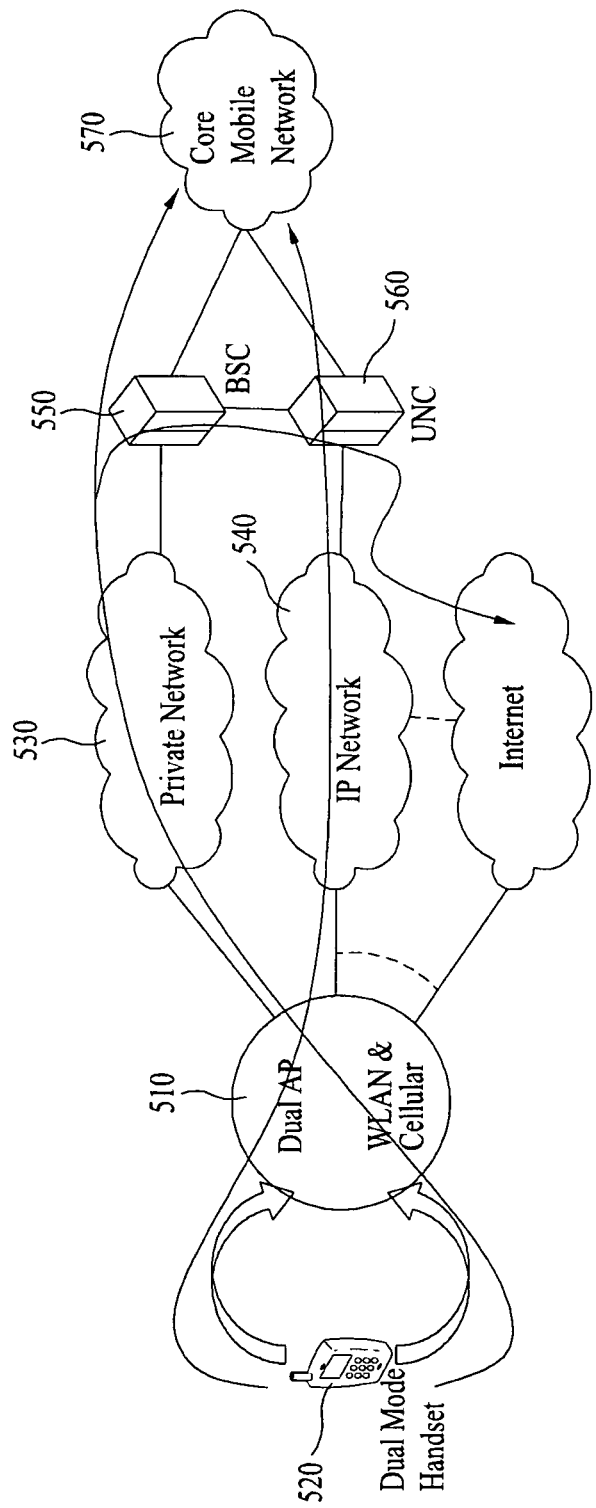
FIG. 5 is a diagram for explaining a newly proposed technology according to the present invention using UMA technology.

FIG. 5 is a diagram for explaining a newly proposed technology according to the present invention using UMA technology.

Referring to FIG. 5, resources used for a network are described in aspect of coordination as follows. First of all, a cellular link between a dual-mode base station 510 and a private network 530 can be wireless. In order to serve a dual-mode MS (dual-mode handset) 520, the dual-mode base station 510 can use the same frequency band with the dual-mode MS 520. A part (generally, it can be a random resource) of a frequency band used by a cellular network can be used as a link between the dual-mode base station 510 and the private network 530. Although the dual-mode base station 510 uses the same frequency band of the dual-mode MS 520, the frequency band used for the link between the dual-mode base station 510 and the private network 530 may differ from that used for the link between the dual-mode base station 510 and the dual-mode MS 520.

For instance, the frequency band used for the link between the dual-mode base station 510 and the private network 530 uses an odd subband of a specific frequency band, while the frequency band used for the link between the dual-mode base station 510 and dual-mode MS 520 can use an even subband of the specific frequency band.

In order to provide a seamless and reinforced access service, two kinds of modes can be simultaneously activated. For instance, while the link between the dual-mode base station 510 and the private network 530 is being activated, the dual-mode MS 520 can transmit data using a WLAN access.

The dual-mode base station 510 can transmit a data packet through the private network 530 while receiving a data packet from the dual-mode MS 520. In particular, the dual-mode base station 510 can transmit a data packet via the private network 530 using an even subband of a specific frequency band while receiving a data packet from the dual-mode MS 520 via an odd subband of the specific frequency band.

If the private network 530 between the dual-mode base station 510 and a BSC 550 is activated (i.e., a cellular access is activated), an IP network 540 between the dual-mode base station 510 and a UNC 560 can be used to support a cellular communication. On the contrary, if the IP network 540 between the dual-mode base station 510 and the UNC 560 is activated (i.e., a WLAN access is activated), it is able to use a cellular access to support a WLAN communication.

The dual-mode MS 520 applies TDD (time division duplex) or FDD (frequency division duplex) to a data packet and can then transmit the data packet to the dual-mode base station 510.

The dual-mode MS 520 applies the TDD to a data packet, which is to be transmitted via the private network 530, and a data packet, which is to be transmitted via the IP network 540, and can then transmit the packets to the dual-mode base station 510. Moreover, the dual-mode MS 520 applies FDD to a data packet, which is to be transmitted via the private network 530, and a data packet, which is to be transmitted via the IP network 540, and can then simultaneously transmit both of the packets to the dual-mode base station 510.

Figure 6:
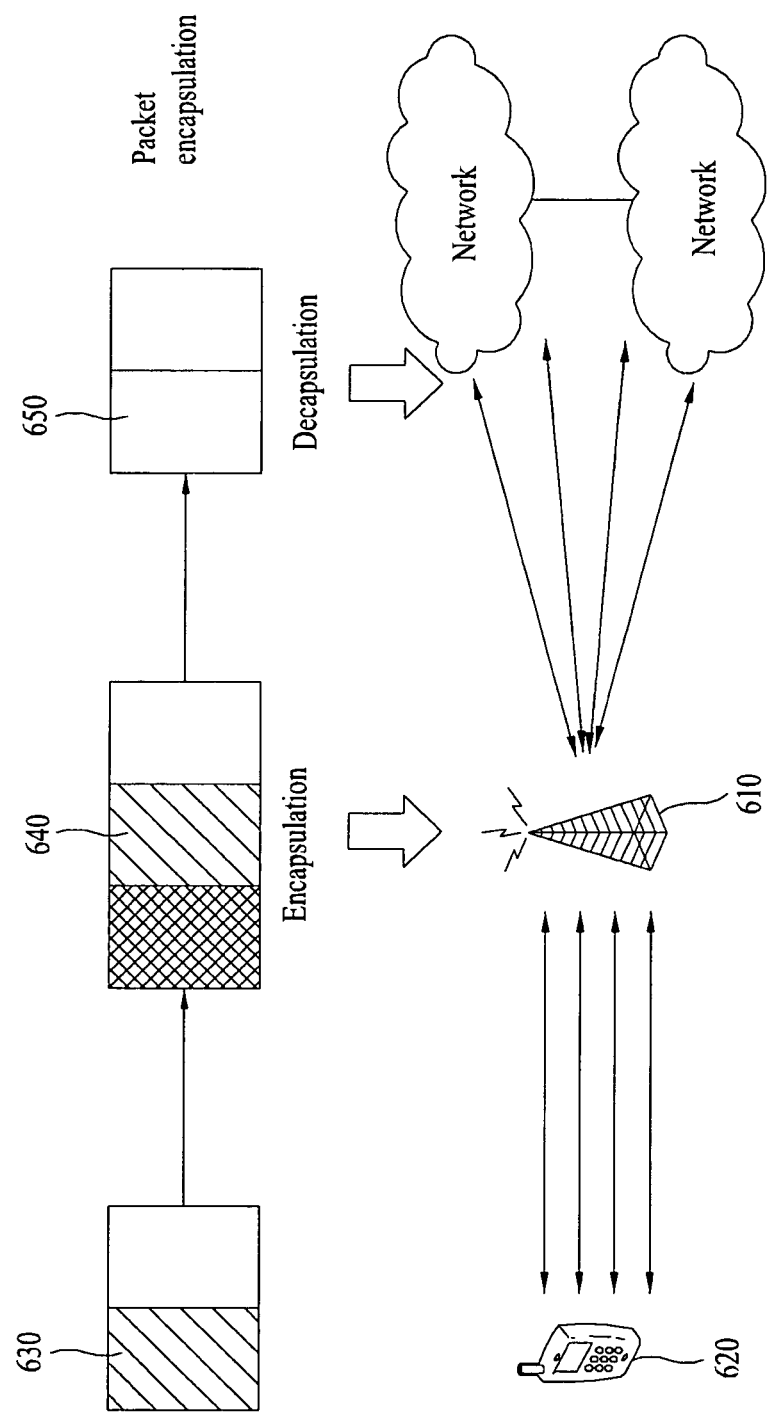
FIG. 6 is a diagram of a method for a dual-mode base station to process and transmit a data packet according to the present invention.

FIG. 6 is a diagram of a method for processing and transmitting a data packet at a dual-mode base station in accordance with the present invention.

Referring to FIG. 6, a dual-mode base station 610 can receive a data packet 630 from a dual-mode MS 620. The data packet 630 may include a header part and a data part. Information on an origin (i.e., the MS 620) and destination of the data packet 630 may be included in the header. The dual-mode base station 610 encapsulates the data packet 630 to generate a data packet 640 of a new type.

A process for encapsulating the received data packet 630 at the dual-mode base station 610 is explained in brief as follows. First of all, the dual-mode base station 610 inserts a header part into the received data packet 630. In this case, information on the dual-mode base station 610 and a destination can be included in the inserted header.

The dual-mode base station 610 can transmit the new data packet 640 to a different network 660, another base station (not shown in the drawing), a network controller (not shown in the drawing) and the like. The different network 660 performs a process for decapsulating the received data packet 640.

Accordingly, the present invention provides the following effects or advantages.

First of all, the present invention transmits a packet for a specific communication scheme in a network using multiple communication schemes via a network using another heterogeneous communication scheme, thereby improving packet transmission efficiency.

Effects obtainable from the present invention are non-limited by the above mentioned effect. And, it is apparent to those skilled in the art that other unmentioned effects should be clearly understandable from the following description.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, combinations of the respective elements disclosed in the foregoing embodiments can be used by those skilled in the art.

Therefore, the present invention non-limits the various forms of embodiments disclosed herein but intend to grant a widest range that matches the principles and new features disclosed herein.

Various embodiments have been described in the best mode for carrying out the invention. Accordingly, a method for transmitting a packet in a network using multiple communication schemes is applicable to various mobile communication systems such as 3GPP LTE system and the like.

What is claimed is:

1. A method of transmitting a packet, at a base station (BS), in a network using a plurality of communication schemes, the method comprising:

receiving, at the BS, a packet of a first communication scheme from a mobile station (MS),
wherein the packet of the first communication scheme comprises a selected transmission path selected by the MS based on a required quality of service (QoS) for the packet of the first communication scheme and a Round Trip Time (RTT) of the selected transmission path measured by the MS, and the selected transmission path indicates a transmission path via a first network using the first communication scheme;

encapsulating, by the BS, the packet of the first communication scheme; and changing, by the BS, the indicated transmission path via the first network into a transmission path via a second network using a second communication scheme based on a traffic state of the selected transmission path via the first network;

transmitting, by the BS, the encapsulated packet to a destination using the changed transmission path via the second network,
wherein the encapsulating is performed by inserting information including the destination and inserting information regarding the BS into the packet of the first communication scheme.

2. The method of claim 1, wherein a frequency band used between the BS and MS is different from that used between the BS and the second network using the second communication scheme.

3. The method of claim 1, wherein a link using the first communication scheme between the BS and the MS uses the same frequency band of a link between the BS and the first network using the first communication scheme.

4. The method of claim 3, wherein the link using the first communication scheme between the BS and the MS uses either an odd or even subband of a same frequency band MS.

5. The method of claim 1, wherein in the receiving, the packet of the first communication scheme is received via the first network or the second network.

6. The method of claim 1, wherein the packet of a first communication scheme includes an indicator identifying a type of communication scheme of the MS.

7. The method of claim 1, wherein the BS is a dual mode BS which supports the first and second communication schemes.

* * * * *